United States Patent Office

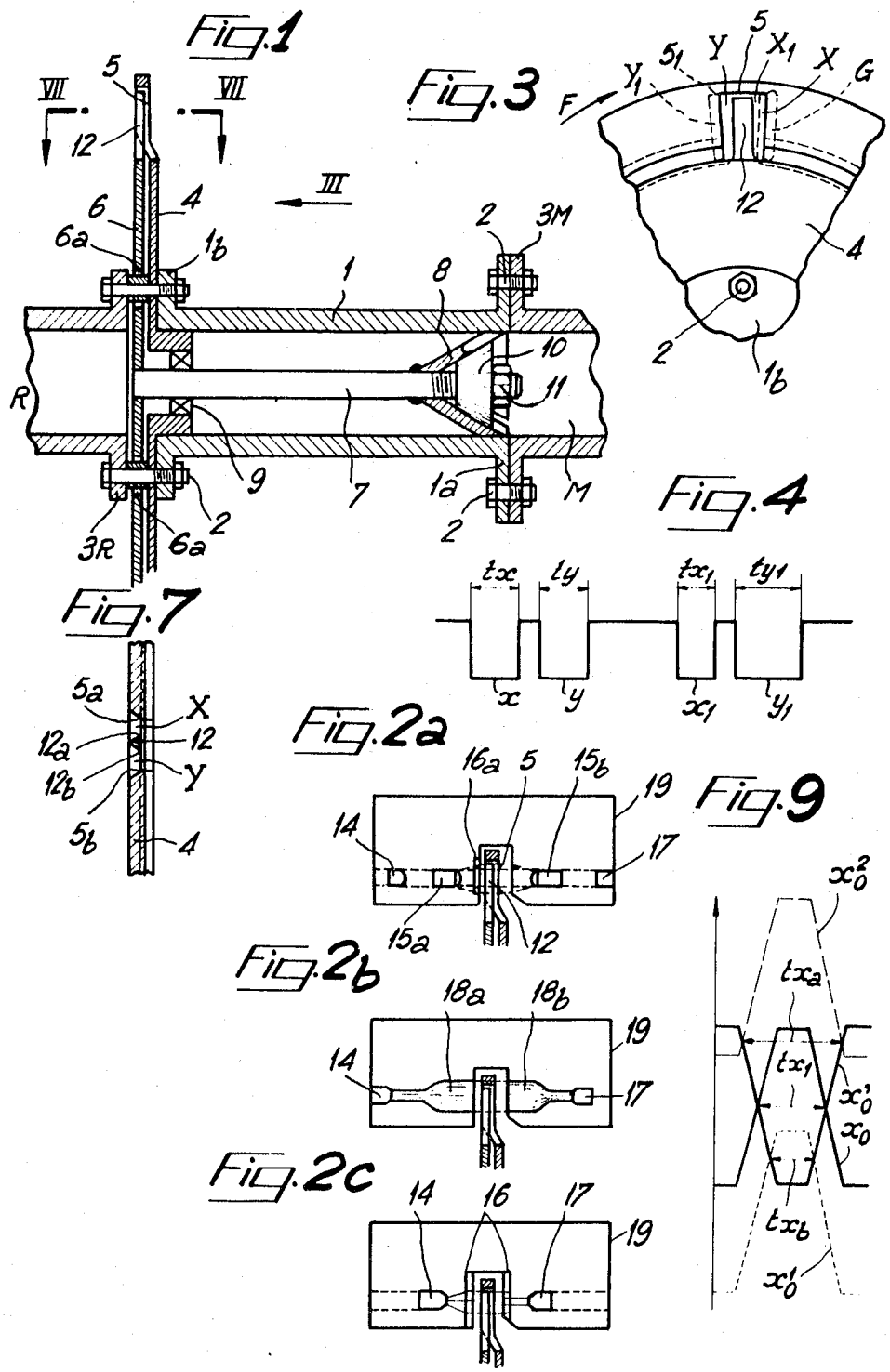

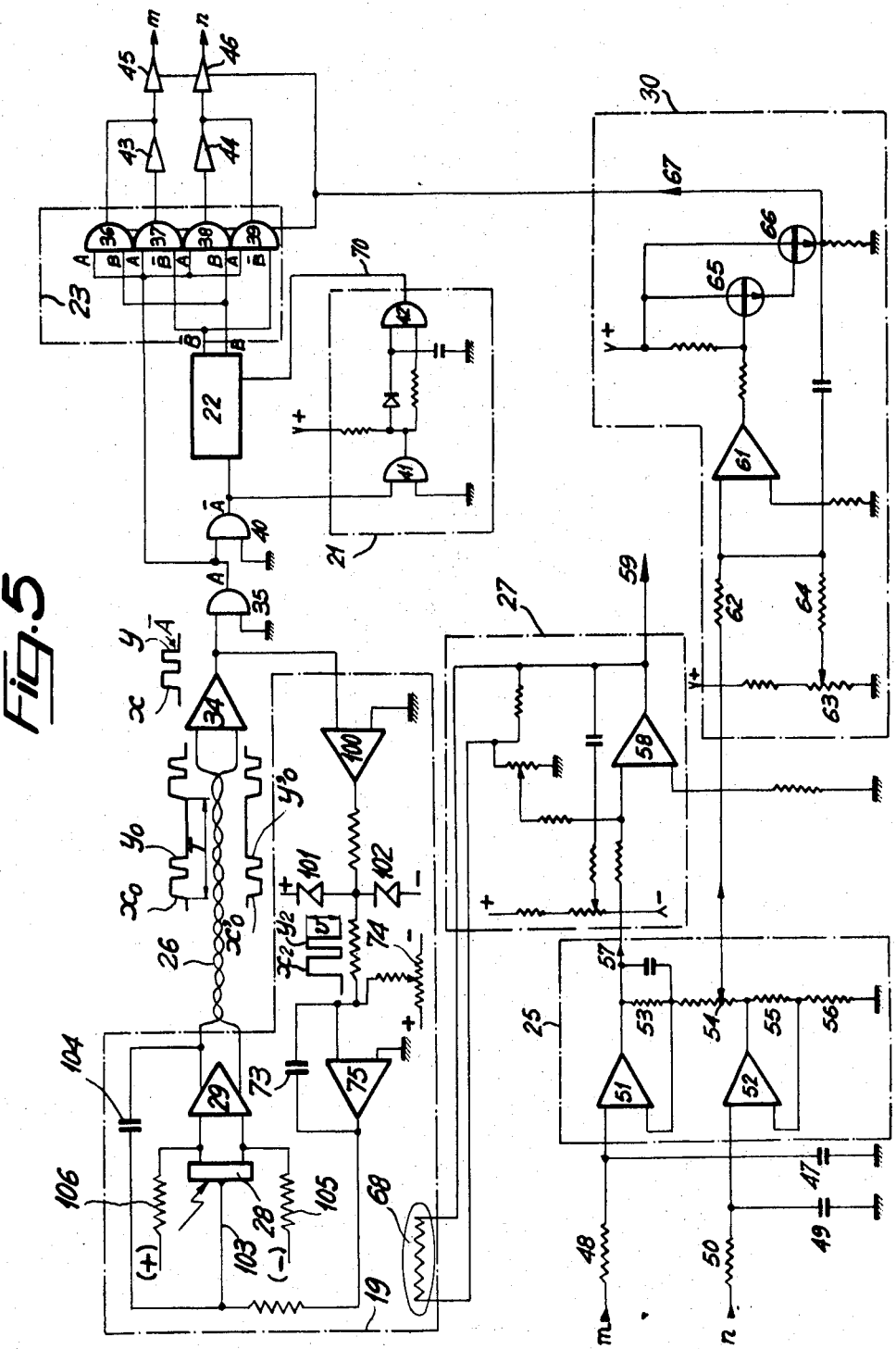

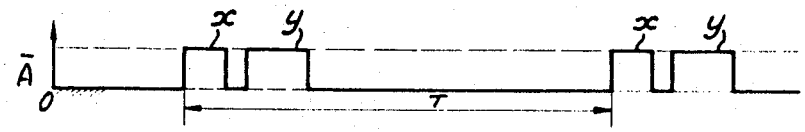
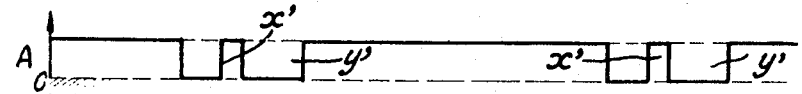
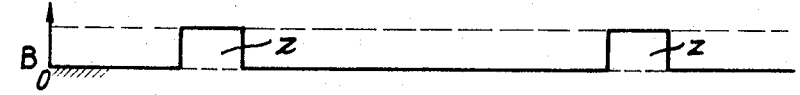
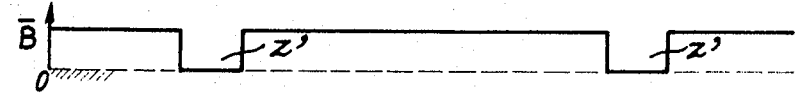
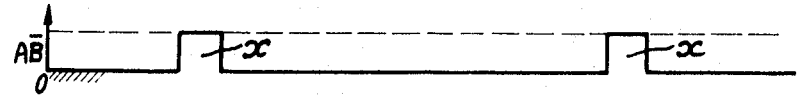
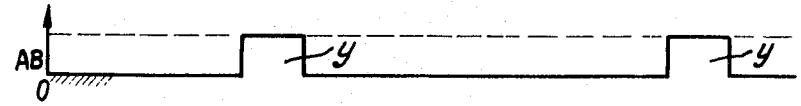
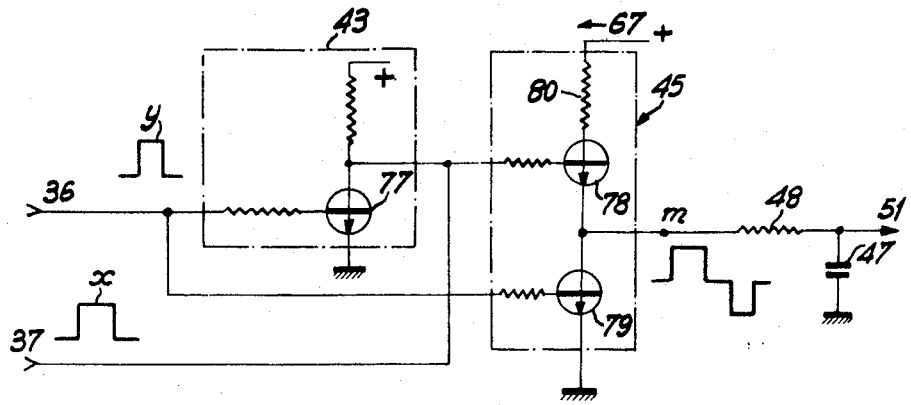

3,625,055
Patented Dec. 7, 1971

3,625,055
SYSTEM FOR MEASURING THE TORQUE TRANSMITTED BY A ROTATING SHAFT
Pierre Lucien Roger Lafourcade, Saint-Victoret, France, assignor to Sud-Aviation, Societe National de Constructions Aeronautiques, Paris, France
Filed Dec. 4, 1969, Ser. No. 882,232
Claims priority, application France, Dec. 9, 1968, 177,223; Nov. 21, 1969, 40,112
Int. Cl. C01l 3/08
U.S. Cl. 73—136 A                                    13 Claims

ABSTRACT OF THE DISCLOSURE

A system for measuring the torque transmitted by a rotating shaft comprises two connected coaxial rotating shafts. One of the shafts transmits the torque which is to be measured. One of the two shafts is rigidly connected to a disc which is formed, towards its periphery, with a rectangular aperture extending tangentially in relation to the axis of the shafts, while the other shaft is rigidly connected to a radial index extending through the said aperture, a fixed light source providing an axial beam of light which, on each revolution of the shafts, illuminates a fixed opto-electronic pick-up through the said aperture, the two electronic signals corresponding to the two successive aperture portions separated by the index being delivered to a comparison system for measuring the relative offset of the two shafts.

---

Systems are already known for measuring the torque transmitted by a rotating shaft and such systems use a shaft portion which is capable of torsion as the measuring element, more particularly systems operating by opto-electronic means. Particularly, devices are already known comprising a pair of concentric discs which rotate relative to one another according to the torsional deflection of the shaft. The pair of discs is provided with alternate similar teeth and slots, such that upon relative rotation a tooth of one disc covers more or less a slot in the other member, thereby altering the area through which light of a source can be transmitted through the discs toward an opto-electronic pick-up. Thus, the mean value of the light transmitted and hence of pick-up current or voltage is a measure of the torque.

The invention concerns a system for measuring a transmitted torque which also makes use of a light source, an opto-electronic pick-up and two relatively rotating members, which permits an accurate measurement of the angular displacement of said members.

The system according to the invention comprises two coaxial rotating shafts rigidly connected at one point of their length, only one of the shafts—which is capable of resilient torsion—transmitting the torque which is to be measured, one of the said two shafts being rigidly connected—at an axial distance from the said assembly—to a disc which is formed, towards its periphery, with a rectangular aperture extending tangentially in relation to the axis of the shafts, while the other shaft is rigidly connected to a radial index extending through the said aperture, a fixed light source providing an axial beam which, on each revolution of the shafts, illuminates a fixed opto-electronic pick-up through the said aperture, the two electronic signals corresponding to the two successive aperture portions separated by the index being delivered to a comparison system for measuring the relative offset of the two shafts.

Preferably, the disc rigidly connected to one of the shafts has a plurality of apertures and the other shaft bears a corresponding number of indexes in order to give a plurality of signals on each revolution.

Before comparison, the signals are advantageously converted to a rectangular shape at the same level and then separated from one another by a suitable logic circuit.

It will be shown hereinafter that the difference in time between these signals is a measurement of the torque which can be made independent of the speed of rotation if it is referred either to the sum of the durations of said signals or to the interval of time separating two consecutive groups of signals. Thus, an analogue circuit showing the integrated difference of the values of the two signals referred to the sum of these two values gives a direct measurement of the value of the transmitted torque.

Two equal and opposite signals are preferably taken from the opto-electronic pick-up—which may advantageously be a photo-transistor—and are amplified in parallel in an amplifier having two inputs and two outputs. This amplifier is connected by a twisted cable to a remote high-gain differential amplifier.

The two signals of opposite sign are added in the differential amplifier so that the output thereof is a rectangular signal whose duration corresponds to the interval of time between the points of intersection of the ascending and descending flanks respectively at the start and end of the two equal opposite signals simultaneously entering the differential amplifier.

Since the supply voltage is stabilised, these signals and their opposites have flank slopes and levels which depend on the intensity of the photon flux reaching the photo-transistor which produces them, i.e., on the transparency of the rectangular aperture and on the speed of rotation, in view of the time constants of the circuit.

Since the differential amplifier starts and stops when the flanks of the opposite signals interesect, any variation in the slope or level of these signals will result in a variation of the duration of the rectangular signals.

To obviate this disadvantage, a mean intersection level can be imposed on the signals and on their opposites by means of a negative feedback circuit disposed between the output and the input of the first amplifier having two inputs and two outputs. However, the correction provided by such a circuit does not involve the opto-electronic pick-up, the twisted line connecting the first amplifier to the differential amplifier, or the differential amplifier.

To obtain a total correction of all the signals transmitted from the opto-electronic pick-up to the differential amplifier, the interval of time between the points where the edges of the signals received in the differential amplifier intersect one another may advantageously be kept substantially constant in said amplifier.

To this end, the opto-electronic pick-up has a biasing electrode and the output of the differential amplifier is connected to this electrode via a negative feedback circuit containing an intergrating amplifier.

Thus the correcting signal fed to the biasing electrode is a mean voltage proportional to the sum of the two consecutive signals of each group, which defines the total width of the aperture, and inversely proportional to the interval of time separating two consecutive groups of signals, so that the circuit is rendered independent of the speed of rotation of the shaft.

In one advantageous embodiment, in order that the correction signal may clear the energy level of the signals leaving the differential amplifier, the negative feedback circuit comprises—at the output of the differential amplifier—an amplifier which is followed by a top and bottom level clipper for the output signal from said amplifier, the mean level of the clipped output signal being adjusted by means of a controllable reference voltage.

The invention will be more readily understood from the following description with reference to the accompanying drawing, which is given by way of example without limiting force.

FIG. 1 is a section of an assembly of coaxial shafts, a disc and an index according to the invention.

FIGS. 2a, 2b and 2c are sections of opto-electronic means which can cause signals to be produced from the division of the aperture by the index.

FIG. 3 is a partial front view—in the direction of the line III in FIG. 1, showing the disc bearing the aperture and the index.

FIG. 4 is a theoretical diagram of the signals delivered by the opto-electronic means.

FIG. 5 is a simplified diagram of the electronic circuits of the system.

FIGS. 6a–6f are diagrams showing the input and output signals of the matrix for separating the signals generated by the two aperture portions.

FIG. 7 is a section through VII—VII in FIG. 1.

FIG. 8 is a detail of a circuit from the block diagram shown in FIG. 5.

FIG. 9 is a diagram showing the operation of part of the circuit shown in FIG. 5.

In the embodiment shown in FIG. 1, a tubular shaft 1 provides a connection between a driving shaft M and a driven shaft R. To this end, bolts 2 connect the flange 1a and the flange 3M, and the flange 1b to the dics 4 and to the flange 3R.

The disc 4 is formed with, for example, three uniformly spaced rectangular apertures 5 of given shape and dimensions.

A second rigid shaft 7, which is preferably also tubular, is disposed coaxially of the tubular shaft and is rigidly connected thereto in contact with the driving shaft M by means of a split expanding cone 8 into which fits a solid male cone 10 which can be driven into the cone 8 by means of a nut 11.

At a distance from this assembly, the shaft 7 is borne in the shaft 1 by a ball-bearing 9 and it is rigidly secured to a disc 6 which bears a number of uniformly spaced indexes 12, the number of indexes being equal to the number of apertures. Enlarged openings 6a providing free passage for the bolts 2 ensure that the discs 4 and 6 are to some extent free to rotate relatively to one another.

To increase the accuracy of the system, the edge of disc 4 is curved so that the indexes 12 (FIG. 7) are in the same plane as the apertures 5. Also, the edges 5a and 5b of the apertures 5 and the edges 12a and 12b of the indexes 12 are bevelled so that—as will be apparent hereinafter—any relative axial oblique position of the rays of light illuminating the apertures does not affect the measurement.

By means of the assembly system 8, 10, 11 it is possible to wedge the shaft 7 relatively to the shaft 1 so that each index 12 occupies a specific starting position in relation to the corresponding aperture 5. However, as will be apparent hereinafter, it is not essential for the wedging to correspond to a strictly defined position of the indexes in relation to the apertures, e.g. the centre of the latter.

As will be apparent hereinafter this position may advantageously correspond substantially to the centre of the aperture if the driving shaft and the driven shaft can rotate in both directions, or alternatively be situated near a radial edge of said aperture if the rotation occurs in only one direction.

It will be assumed—as shown in FIGS. 3 and 7—that each index 12 is secured initially in the middle of the corresponding aperture 5 so that the widths of the two free parts X and Y of the aperture are equal.

If the system rotates in the direction of the arrow F the torque transmitted by the shaft 1 and causing it to experience resilient torsion in its part comprised between the assembly 8, 10, 11 and the discs 4, 6 will cause the disc 4 bearing the aperture to experience a time lag with respect to the disc 6 and hence to the index 12, so that during the rotation, for this given torque, the aperture will occupy the position $5_1$ in relation to the index 12. As a result, the aperture portions will respectively become $X_1$ and $Y_1$.

If the aperture is then illuminated by a flat radial beam of light G extending through the aperture to an opto-electronic pick-up, a simultaneous rotation of the two shafts 1 and 7 without any transmitted torque will produce two equal signals $x$ and $y$ (FIG. 4), while if the rotation takes place with the torque which causes an angular offset of the aperture at $5_1$, the signals will become $x_1$ and $y_1$. Since the speed of rotation remains practically constant while the aperture is being swept by the beam G the duration of these signals will be proportional to the width of the aperture portions $X_1$ and $Y_1$.

The angular offset of the index 12 in relation to the aperture 5 is a measurement of the torsion of the shaft 1 in relation to the shaft 7 which does not experience any torsion, so that the time difference $tx_1 - ty_1$ is a measurement—to within a constant (if the two parts X and Y are not initially equal)—of twice the offset angle while the total time $tx_1 + ty_1$ is a measurement of the width of the aperture referred to the speed of rotation of the system or, conversely, the aperture width being known and constant, this total time is a kind of scale of the said time difference corresponding to this speed of rotation.

FIGS. 2a, 2b and 2c show arrangements of source of light and opto-electronic pick-up for providing and picking up the beam G.

Referring to FIG. 2a, the casing 19 of this arrangement consists of a light source 14 delivering a beam which is converted to a flat radial beam of light G by means of the optical system 15a and the diaphragm 16a. The optical system 15b concentrates the flat beam leaving the aperture onto the opto-electronic pick-up 17. The casing 19 caps and covers the discs 4 and 6 at the indexes and apertures.

In the embodiment shown in FIG. 2b, the flat beam G is obtained by a light duct 18a formed by light-transparent fibres distributed in a radial plane, and then the beam is concentrated on the pick-up 17 by a second symmetrical light duct 18b.

In the case of FIG. 2c, only diaphragms 16 are used to select the flat beam G.

However, in practice, the theoretical signal shapes shown in FIG. 4 are not obtained at the output of the pick-up 17.

The reason for this is that, e.g. in the case of gas turbines, the speed of rotation may be very much higher than 20,000 r.p.m., while the pick-up 17 has an inherent response time so that the rising and falling edges of these signals are not steep edges. Also, the level of these signals depends primarily on the transparency of the aperture 5 which may be disturbed by smoke or vapours when the system is incorporated in a heat engine.

The circuit shown in FIG. 5 provides a correction for the duration and re-shaping of the signals $x$ and $y$ and enables these two signals to be separated by means of a logic circuit. The latter (top part of FIG. 5) also contains the storage registers and the circuits for re-zeroing after each train of two pulses $x$ and $y$ has passed.

This circuit also comprises an analogue circuit (bottom part of FIG. 5) in which the signals corresponding to $x$ and $y$ are processed so as to become respectively proportional to $$\frac{tx}{tx+ty}$$

and $$\frac{ty}{tx+ty}$$

and then subtracted and added.

As already indicated the difference between these integrated signals is proportional to the torque and since it is referred to the sum $tx+ty$ the result is independent of the speed of rotation.

The sum of the signals which is theoretically constant for a given speed of rotation forms a corrective term for the measurement obtained from the difference between said signals, so that the measurement linearity and circuit drift can be corrected. This sum is not used directly but is compared with a constant information of the same nature so that the circuit 30 delivers a voltage which corrects the level of the signals at their output.

This voltage, which is obtained by an analogue process, is applied by a negative feedback loop (67) to the circuits delivering these signals so that the output amplifier 27 can directly deliver the value of the torque.

Having outlined the functions of the circuit, the circuit and its operation will be explained in detail below.

The emitter-collector circuit of the phototransistor 28 is connected between the two poles of the voltage supply; the signals $x_0$ and $y_0$ and their opposites $x'_0$ and $y'_0$ are taken from equal load resistors 105 and 106 and fed to the inputs of the amplifier 29.

The opto-electronic pick-up—the photo-transistor in this case receives the beam of light extending through the aperture of the rotating disc and a correction voltage, the value of which is indicated hereinafter and which is supplied to its biasing electrode—in this case the base 103 of the transistor.

The electrode 103 is also connected by a feedback circuit containing the capacitor 104 to an output of the amplifier 29. This feedback partially compensates the inherent capacity of the photoelectric input of the phototransistor.

The twisted line 26 connects the two outputs of the amplifier 29 to the two inputs of a circuit 34 which operates as a high-gain differential amplifier.

This amplifier is adapted to convert these pairs of opposite signals into rectangular signals. Receiving these opposite signals superimposed on one another, it is triggered when the oblique variation of the signal flanks causes the levels of the oposite signals $x_0$ and $x'_0$ to become equal, whereupon their difference changes sign. Any variation in the slope of the flanks of the signals, like any variation in the level of the signals, therefore results in a variation of the time when two opposite signals become equal and hence a variation in the duration of the rectangular signals $x$ and $y$. This disadvantage is overcome by the following negative feedback circuit.

The output of the amplifier 34, at which the signal train $\overline{A}$ appears is connected to the reversing gate 35 situated at the start of the processing circuit for this signal, and also to the input of an amplifier 100. The signals leaving this amplifier are clipped at both the top and bottom by Zener diodes 101 and 102. These signals are then injected into the amplifier 75, which has an integrating capacitor 73; their reference level is selected by means of a potentiometer 74.

The output of the integrating amplifier is connected to the base 103 of the photo-transistor 28.

As a result of the amplification of the signals $\overline{A}$ at 100 followed by their clipping, the rectangular signals of the total signal $\overline{A}$ have a constant potential level or difference $v$.

The mean voltage of the integrating amplifier 75 is therefore proportional to the total time of the two signals $x_2$ and $y_2$, i.e. $t_x+t_y$ of the pairs of successive signals, and inversely proportional to the interval of time T separating two successive groups of these signals.

If the intersection level of the flanks of the signals $x_0$ and $x'_0$, $y_0$ and $y'_0$ in the differential amplifier 34 is correct, the total itme $t_x+t_y$ corresponds exactly to the width (or tangential length) of the aperture and, like the time T, it is inversely proportional to the speed of rotation.

In oher words the mean output voltage of the amplifier-integrator 75, which is proportional to $$\frac{t_x+t_y}{T}$$

is independent of the speed of rotation and also has a constant value if the value $$\frac{t_x+t_y}{T}$$

is equal to its initial calibration value, i.e., if the times $t_x$ and $t_y$ truly correspond to the aperture portion widths.

However, this value of $$\frac{t_x+t_y}{T}$$

may vary, for example, as a result of interference effects, such as aperture transparency variations as already indicated.

Without reference to any specific potential, FIG. 9 diagrammatically illustrates the intersection of an opposite signal $x'_0$ and three direct signals $x^1_0$, $x_0$ and $x^2_0$ situated invarious positions in relation to the signal $x'_0$.

If the intersection level is correct, the duration of the rectangular signal corresponding to the first part of the aperture will have the value $t_x$ in the total signal $\overline{A}$. If the level is incorrect its duration will be too long ($tx_a$) or too short ($tx_b$).

If the duration is too long ($x_a$) the correction signal applied to the base 103 will be higher than the normal correction, thus reducing the relative potential difference of the opposite signals transmitted by the network 29–26–34 and hence bringing the intersection level back to the level corresponding to the value $t_x$. Conversely, if the duration is to short ($tx_b$), the relative potential difference of the opposite signals transmitted and hence their intersection level will be increased.

In this way, irrespective of the initial amplitude variations of the photo-electric signals due, inter alia, to aperture transparency variations, the circuit will respond—not to correct this amplitude—but to correct the level of intersection of the flanks of the opposite signals in order to keep the ratio $$\frac{t_x+t_y}{T}$$

constant.

Thus, for any speed of variation of the shaft whose torque is being measured, the correction voltage governs the duration of the signals $x$ and $y$ so that the speed in question said signals exactly represent the width of two aperture portions. This voltage also compensates the errors which may occur at any point of the network 28–29–26–34, and, inter alia, this enables the twisted line 26 to be given any length.

The variations in the luminous flux through the aperture can thus reach the coefficient 50 without interfering with the measurement of the opto-electronic pick-up can be replaced without any adjustment or interference.

The system 29, 100, 101, 102, 74 is preferably incorporated in the casing 19.

As a result of the twisted line 26, the circuit 34 can be disposed at a distance from the casing 19 (e.g. in the cabin of an aircraft when the system used for measuring the torque is applied to an aircraft turbine).

It will be apparent that the interference picked up and transmitted by this line reaches the differential amplifier 34 in the form of like signals and the amplifier 34 cancels them out and delivers the amplified sum of the signals $x_0$ and $y_0$ and of their opposites $x'_0$ and $y'_0$ thus converting these signals into rectangular signals.

The signal $\overline{A}$ collected at the output of the differential amplifier 34 is shown in FIG. 6a which comprises the signal train $x$ and $y$ in the form of positive rectangular pulses.

From the signal $\overline{A}$ the reversing gate 35 delivers the signal A (FIG. 6b) comprising the signals $x'$ and $y'$, which is fed (FIG. 5) to the AND gates 36, 37, 38 and 39 and to the reversing gate 40 which feeds two flip-flops 21 and 22.

The bistable flip-flop 22 changes state whenever it receives a leading edge of a signal $\overline{A}$ so that its output delivers the two opposite signals B and $\overline{B}$ respectively shown in FIGS. 6c and 6d, which respectively contain the opposite signals z and z'.

The monostable flip-flop 21 formed by the two gates 41 and 42 coupled by a resistance-capacitance network delivers a re-zeroing signal via the connection 70 to the flip-flop 22 at the end of a shorter time than the shortest possible interval of time T (FIG. 6a) between two consecutive trains of signals x, y. As a safety measure, this flip-flop thus re-zeros the flip-flop 22 as is necessary after each train of signals.

From the signals A, B and $\overline{B}$, the matrix 23 formed by the AND gates 36 to 39 separates the signals x and y. The gates 37 and 39 at which the signals A and $\overline{B}$ are admitted simultaneously allow a signal to pass only when these two signals are simultaneously zero. It will be seen that the signal x on its own is obtained in this way (FIG. 6e). Similarly, the gates 36 and 39 deliver just the signal y (FIG. 6f) under the same conditions.

As will be apparent hereinafter, the level of these signals is controlled by the negative feedback 67 provides by the system 30.

Each of the gates 36 to 39 is associated with a power gate (43 to 46) which during the period of a signal x or y enables a positive voltage to be transmitted, allows m and n to be earthed or to be isolated.

Thus, the line m is rendered positive (by the gate 43) during each signal y, and is then earthed (by the gate 45) during each signal x and is finally isolated outside these signals.

Conversely, the line n is positive during each signal x, earthed during each signal y, and isolated for the rest of the time.

FIG. 8 shows the circuit for the gates 43 and 45 to give this result.

The gate 43 comprises the npn transistor 77 and the gate 45 comprises the npn transistors 78 and 79. The output of transistor 77 is connected to the base of transistor 78 which also directly receives the signal x from gate 37. The signal y from gate 36 is fed directly to the base of the transistors 77 and 79.

In the absence of signals, none of the transistors conducts and the line m is therefore isolated.

When a signal x appears, only transistor 78 conducts and line m is brought to the potential determined by the line 67 via the resistor 80.

When a positive signal y appears, the two transistors 77 and 79 become conductive and the line m is earthed by the transistor 79, because the transistor 78 is cut off by the earthing voltage applied to its base.

Thus the capacitor 47 is charged during the time tx through the resistor 48 and then discharged during the time ty through the same resistor.

Since the circuit for the gates 44 and 46 is similar, the capacitor 49 is also charged during the time ty and then discharged at the following time tx through the resistor 50.

Under these conditions, since the capacitors 47 and 49 and the resistors 48 and 50 are equal, the charges integrated in the capacitors 47 and 49 are respectively proportional to $$\frac{tx}{tx+ty}$$

and $$\frac{ty}{tx+ty}$$

and are a function of the voltage fed via line 67.

The voltages of these capacitors are fed to the input of the two high-impedance amplifiers 51 and 52 which as a result of their negative feedback circuit and with the voltage divider 53, 54, 55, 56 in parallel at their outputs, form a differential amplifier having a high input impedance. This system forms a computer which delivers the difference and the sum respectively of the output signals of the amplifiers 51 and 52. The difference between these signals, which is proportional at $$\frac{tx-ty}{tx+ty}$$

and which is taken from the connection 57 is fed to the amplifier 58 and the signal at the output 59 thereof can be fed to an indicator which can be graduated in torque values.

The sum of these signals, which is theoretically a constant voltage and which is taken from the connection 54, is fed to the input of the D.C. amplifier 61 by means of the resistor 62. However, the said sum is likely to vary as a result of temperature variations and component drifts in time.

A reference voltage is superimposed, at the input to amplifier 61, on the signal taken from 54, by means of the potentiometer 63 and the resistor 64.

At the output of amplifier 61, the signal current is amplified by the Darlington circuit formed by the two npn transistors 65 and 66, and then the output of this latter circuit feeds the negative feedback line 67.

In this way, the value of the said difference between the signals taken from the output of the amplifier 58 is corrected by the deviation of the value of their sum from a reference voltage so that the measurement is made linear and the circuit is stabilised.

It is also possible to provide a correction in dependence upon the temperature of the rotating system, which will alter the Young's modules of the torsion shaft 1. To this end, a probe 68 formed by a thermistor is inserted in a negative feedback circuit of the amplifier 58. This probe is disposed near the shaft 1 so that it can be influenced by the temperature of the latter. It can be incorporated in the casing 19.

Of course modifications can be made to the above-described embodiments, more particularly by the substitution of equivalent technical means, without thereby departing from the scope of the invention.

I claim:

1. A system for measuring the torque transmitted from a driving member to a driven member, such system comprising two coaxial rotating shafts, one of the shafts being torsionally resilient and connected to the driving and driven members for transmitting the torque which is to be measured therebetween; a connecting assembly rigidly connecting the two shafts at one point of their length; a disc which is formed, towards its periphery, with aperture means including at least one rectangular aperture extending tangentially in relation to the axis of the shafts, the disc being rigidly connected to one of said shafts at an axial distance from said connecting assembly; index means including at least one radial index rigidly connected to the other shaft, each radial index extending through a respective rectangular aperture; a fixed light source and a fixed opto-electronic pick-up, the light source delivering an axial beam of light which, on each revolution of the shafts, illuminates the fixed opto-electronic pick-up through said aperture means, two signals corresponding to two aperture portions separated by a radial index being fed to a comparison system for measuring the torsion experienced by said torsionally resilient shaft.

2. The system specified in claim 1, wherein said connecting assembly comprises an expanding cone system whereby the initial relative position of said aperture means and said index means can be accurately preset.

3. The system specified in claim 1, wherein said fixed light source delivers a radially flat beam having a thickness less than the width of the aperture means in the tangential direction.

4. The system specified in claim 1, wherein the speed of rotation of the system formed by the two shafts is variable and the value of the difference between the duration of the signals is referred to the value of their sum by the comparison system, so that the speed variation does not affect the measurement.

5. The system specified in claim 1, wherein the optoelectronic pickup is connected to both inputs of a first amplifier having two inputs and two outputs, both outputs of said first amplifier being connected by a twisted cable to a spaced apart high-gain differential amplifier.

6. The system specified in claim 5, wherein said optoelectronic pick-up includes a biasing electrode, the output of said differential amplifier being connected to said biasing electrode by a negative feedback circuit comprising an integrating amplifier.

7. The system specified in claim 6, wherein the negative feedback circuit further comprises, before said integrating amplifier, a second amplifier followed by a top and bottom level clipper of the output signal thereof, and a controllable reference voltage for adjusting the mean level of said output signal after clipping.

8. The system specified in claim 5, wherein the said first amplifier comprises a capacitive feedback circuit.

9. The system specified in claim 1, wherein said comparison circuit comprises a logic circuit for separating the two signals induced by the two portions of one rectangular aperture.

10. The system specified in claim 9, wherein the logic circuit comprises at least two AND gates and a bistable flip-flop controlled by the two signals successively, each AND gate being fed by said two signals and one of the two output signals of said bistable flip-flop.

11. The system specified in claim 9, further comprising an integrator circuit, wherein each AND gate delivering one of the two signals corresponding to an aperture portion is associated with a second AND gate which delivers the other signal corresponding to the other portion of the same aperture and the first of the two associated gates controls the charging while the second controls the discharge of said integrator circuit.

12. The system specified in claim 11, having two pairs of AND gates each controlling an integrator circuit, wherein the outputs of the two integrator circuits are connected to a further differential amplifier circuit, from the output of which is taken the amplified difference of its two input signals.

13. The system specified in claim 11, having two pairs of AND gates each controlling an integrator circuit and further comprising a summing junction of the output signals of the two integrator circuits; a reference voltage; a further amplifier the input of which is connected to said summing junction and to said reference voltage and the output to biasing means of said integrator circuits whereby a negative feedback voltage is fed to the said two integrator circuits in order to determine the charging level thereof.

References Cited
UNITED STATES PATENTS

| | | | |
|---|---|---|---|
| 2,519,378 | 8/1950 | Kilpatrick | 73—136 X |
| 2,679,755 | 6/1954 | Mohnkern | 73—136 |
| 3,111,028 | 11/1963 | Lebow | 73—136 |

FOREIGN PATENTS 417,051    9/1934    Great Britain.

CHARLES A. RUEHL, Primary Examiner

U.S. Cl. X.R.

250—231 R